(12) United States Patent
Länsiö et al.

(10) Patent No.: US 7,096,267 B2
(45) Date of Patent: Aug. 22, 2006

(54) DATA TRANSMISSION METHOD AND ARRANGEMENT USING METHOD CALLS

(75) Inventors: Jari Länsiö, Tampere (FI); Lauri Piikivi, Oulu (FI)

(73) Assignee: Nokia Mobile Phones, Ltd., Espoo (FI)

( * ) Notice: Subject to any disclaimer, the term of this patent is extended or adjusted under 35 U.S.C. 154(b) by 749 days.

(21) Appl. No.: 09/859,653

(22) Filed: May 17, 2001

(65) Prior Publication Data

US 2001/0047427 A1 Nov. 29, 2001

(30) Foreign Application Priority Data

May 19, 2000 (FI) .................................. 20001209

(51) Int. Cl.
*G06F 13/00* (2006.01)

(52) U.S. Cl. ...................... 709/227; 709/219; 709/225; 709/250; 719/311; 719/313

(58) Field of Classification Search ................ 709/203, 709/217, 219, 225, 227, 229, 249, 250; 370/401, 370/902, 903, 913
See application file for complete search history.

(56) References Cited

U.S. PATENT DOCUMENTS

| | | | | |
|---|---|---|---|---|
| 6,049,819 | A * | 4/2000 | Buckle et al. .............. | 709/202 |
| H1921 | H * | 11/2000 | Fletcher et al. ............. | 455/433 |
| 6,223,291 | B1 * | 4/2001 | Puhl et al. .................. | 713/201 |
| 6,269,373 | B1 * | 7/2001 | Apte et al. ..................... | 707/10 |
| 6,418,146 | B1 * | 7/2002 | Miloslavsky ................ | 370/400 |
| 6,542,908 | B1 * | 4/2003 | Ims ............................. | 707/204 |
| 6,757,708 | B1 * | 6/2004 | Craig et al. ................. | 709/203 |
| 6,813,629 | B1 * | 11/2004 | Kocherlakota et al. ..... | 709/203 |

FOREIGN PATENT DOCUMENTS

| | | |
|---|---|---|
| EP | 0821507 | 1/1998 |
| EP | 0822492 A2 | 2/1998 |
| EP | 0924607 A2 | 6/1999 |
| EP | 0959600 | 11/1999 |
| FI | 104873 | 4/2000 |
| WO | WO 98/02814 | 1/1998 |
| WO | WO 98/45988 | 10/1998 |
| WO | WO 00/59239 | 10/2000 |
| WO | WO 01/33804 | 5/2001 |

OTHER PUBLICATIONS

"Supporting CORBA Applications in a Mobile Environment", Haahr et al., Mobicom 99, 1999, pp. 36-47.
"Using WAP as the Enabling Technology for CORBA in Mobile and Wireless Environments", Ruggaber et al., 1999 IEEE, pp. 69-74.
"The Common Object Request Broker: Architecture and Specification", Revision 2.0, published by OMG (Object Management Group), 1995, 52 page document.

* cited by examiner

*Primary Examiner*—Viet D. Vu
(74) *Attorney, Agent, or Firm*—Perman & Green, LLP (57) ABSTRACT

The invention relates to a data transmission arrangement between at least two apparatuses in a system in which part of the connection between different apparatuses is a wireless connection. The apparatuses communicate with method calls containing a service request. Service brokers direct the service request to a given server, which replies to the method call according to the required service by sending the information required for the service to the service broker which sends the information to the sender of the method call. The arrangement further comprises an adapter which is connected to wireless apparatuses and which adapts the protocol used in the wireless connection to the rest of the network. The adapter finds the server providing the requested service on behalf of the apparatus which sent the method call and operates in a wireless network.

14 Claims, 8 Drawing Sheets

Fig. 9

DATA TRANSMISSION METHOD AND ARRANGEMENT USING METHOD CALLS

FIELD OF THE INVENTION

The invention relates to a data transmission method and arrangement, in which data is transmitted between a wireless system and another system. The invention especially relates to systems in which data is transmitted between software in different apparatuses.

BACKGROUND OF THE INVENTION

In designing and maintaining data systems, attention has been attached to creating connections between various systems and to their fluent operation. Systems that are separate from each other are often implemented by various methods and different types of hardware which are not compatible. Making various systems compatible has been arduous and time-consuming, if at all possible.

This is why several hardware and system manufacturers have developed a common architecture, CORBA (Common Object Request Broker Architecture), with which computer systems of different type and implemented using different programming languages can flexibly communicate with each other. CORBA defines the GIOP protocol (General Inter-ORB Protocol), by means of which hardware of different type and programs programmed with different programming languages can communicate. The GIOP protocol is a common protocol, and on the basis of it, the IIOP (Internet Inter-ORB Protocol) has been developed especially for the Internet environment. Additional information on CORBA can be found in for instance "The Common Object Request Broker: Architecture and Specification," Revision 2.0, published by OMG (Object Management Group) that created the architecture. The specification can be found at www.omg.org.

CORBA has been developed for systems which have a fixed connection to each other through a non-specified network. When designing the protocol, attention was not so much attached to the possible capacity of the transmission path as to creating a flexible and safe protocol. Because the proportion of wireless communication has lately been increasing strongly, there has also been a tendency to use data systems and different types of software in computers and apparatuses whose only or primary connection to other networks is over a wireless network, such as the GSM, GPRS or UMTS. The ability of wireless networks to transmit information is considerably lower than that of fixed, wire networks. This is why the application of CORBA in wireless systems has not been wide-spread. Transmitting CORBA over a wireless transmission path has proven to be very slow due to the heavy signalling and the large amount of data to be transmitted.

Figure 1:
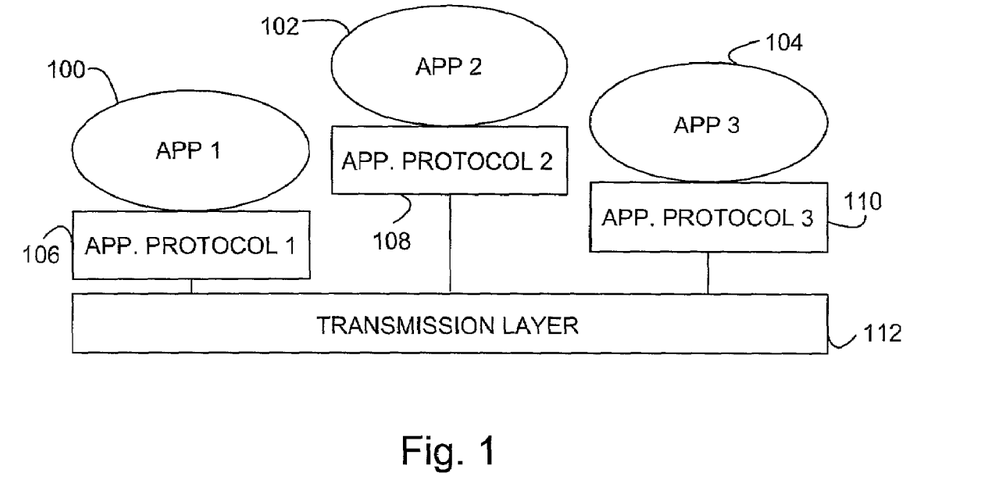
FIG. 1 illustrates application protocols of prior art as already described.

In software applications in wireless apparatuses, the applications have usually defined their own interfaces and protocols, which have been directly connected to the actual data transmission. FIG. 1 illustrates this. The figure shows three software applications 100 to 104 operating in an apparatus using a wireless connection. Each software has its own protocol 106 to 110, by means of which it is in contact with the transmission layer 112 which manages data transmission using the wireless connection. In this solution, the applications have to be connected to the transmission layer, which makes application development difficult and awkward.

BRIEF DESCRIPTION OF THE INVENTION

It is thus an object of the invention to implement a method and an arrangement implementing the method in such a manner that the above-mentioned problems can be reduced. This is achieved by a method for implementing data transmission between at least two apparatuses which comprise means to establish a connection to a data transmission system, in which method at least a part of the connection between two different apparatuses is implemented by means of a wireless connection and at least a part of the communication of the apparatuses is done by means of method calls, each method call containing a service request and the method call being directed to a service broker of the system, which directs the service request in the method call to a given server which replies to the method call according to the requested service by transmitting the information required by the service to the service broker which transmits the information to the sender of the method call, and in which method, during communication, the server providing the requested service is defined, with which communication, authentication of the parties is associated to improve safety. In the method of the invention, apparatuses using wireless connections transmit the method calls to an adapter which adapts the protocol used in the wireless connection to the rest of the network, and the adapter finds the server providing the requested service on behalf of the apparatus which transmitted the method call and operates in the wireless network.

The invention also relates to an arrangement for implementing data transmission between at least two apparatuses which apparatuses comprise means to establish a connection to a data transmission system in which system at least a part of the connection between at least two different apparatuses is implemented by a wireless connection and in which system at least a part of the communication of the apparatuses is arranged to take place by means of method calls, each method call containing a service request, and which system comprises one or more service brokers which direct the service request in the method call to a given server which is arranged to reply to the method call according to the required service by transmitting the information required by the service to the service broker which is arranged to transmit the information to the sender of the method call, and during which communication, the server providing the requested service is defined, and with which communication, authentication of the parties is associated to improve safety. The arrangement of the invention comprises an adapter which is connected to wireless apparatuses and which adapts the protocol used in the wireless connection to the rest of the network, and which adapter is arranged to find the server providing the requested service on behalf of the apparatus which transmitted the method call and operates in the wireless network.

Preferred embodiments of the invention are set forth in the dependent claims.

The invention is based on the system comprising a separate adapter for wireless apparatuses, which adapts the protocol, e.g. GIOP protocol, used in the fixed network to a format better transmitted on a wireless transmission path. In practice, this is done by simplifying the commands of the protocol and by transferring the functions required by the protocol from the wireless apparatus to the adapter as much as possible.

The method and arrangement of the invention provide several advantages. Because the invention makes it possible to use the same protocol in several software applications in wireless apparatuses, which protocol is not bound to the transmission layer and is in its basic structure similar to a protocol in a fixed network, software development and implementation of communication becomes considerably simpler without loading the transmission path too much or making the connection inconveniently slow.

BRIEF DESCRIPTION OF THE FIGURES

In the following, the invention will be described in greater detail by means of preferred embodiments and with reference to the attached drawings in which.

DETAILED DESCRIPTION OF THE INVENTION

The present invention can be used in different radio systems in which terminals have different radio path properties. The multiple access method used in the system has no relevance as such to the invention. CDMA, WCDMA and TDMA, for instance, are possible multiple access methods. Further, the system may support both circuit-switched and packet-switched connections.

The structure of a mobile telephone system according to preferred embodiments of the invention and used as an example is described with reference to FIG. 2. This is just one possible alternative, as is obvious to a person skilled in the art. The main parts of the mobile telephone system are a core network CN, a terrestrial base station subsystem BSS and a subscriber terminal MS. The interface between the CN and the BSS is in this example called Gb and the air interface between the BSS and the MS is called Um.

The base station subsystem comprises radio network subsystems RNS. Each radio network subsystem RNS comprises a radio network controller RNC and one or more base stations B comprising transceivers. The interface between the radio network controller and the base station is called Iub. The service area, i.e. cell, of the base station is marked with C in FIG. 2.

Figure 2:
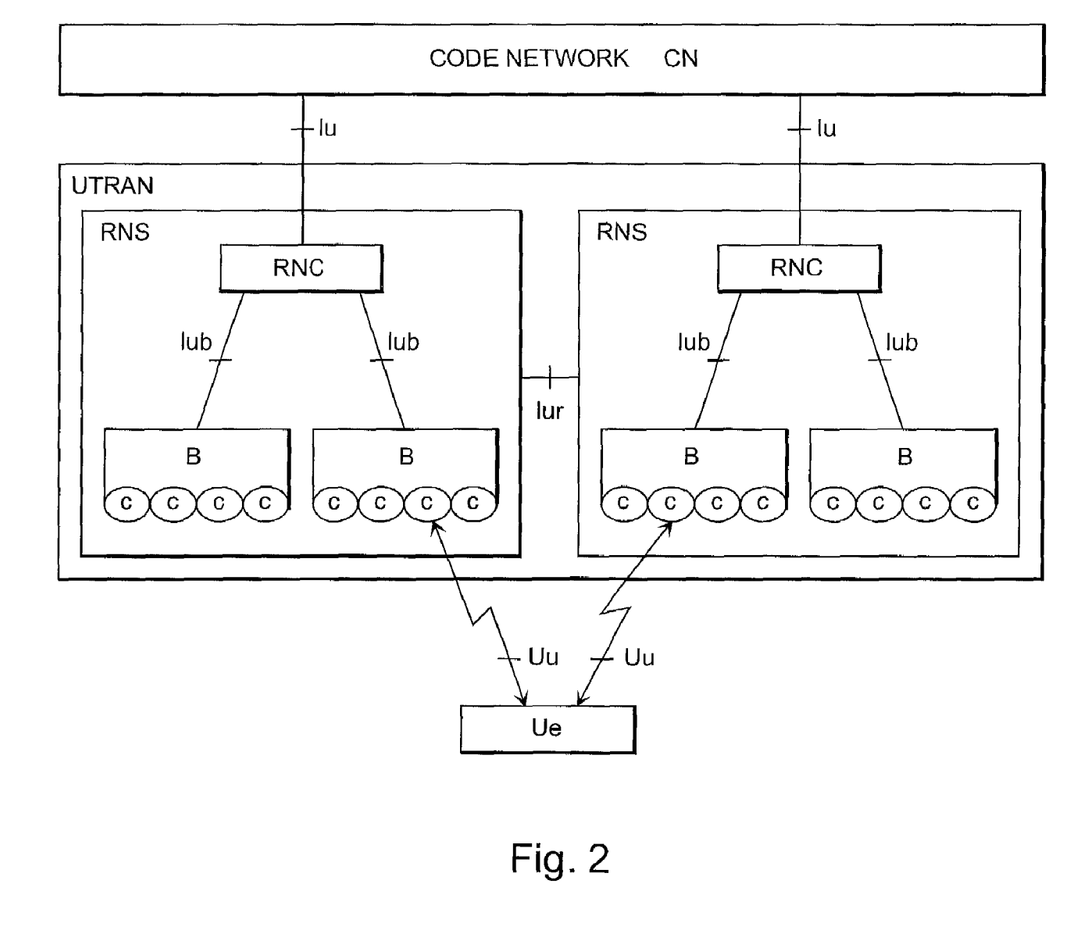
FIG. 2 illustrates the structure of a mobile telephone system used as an example.
Figure 3:
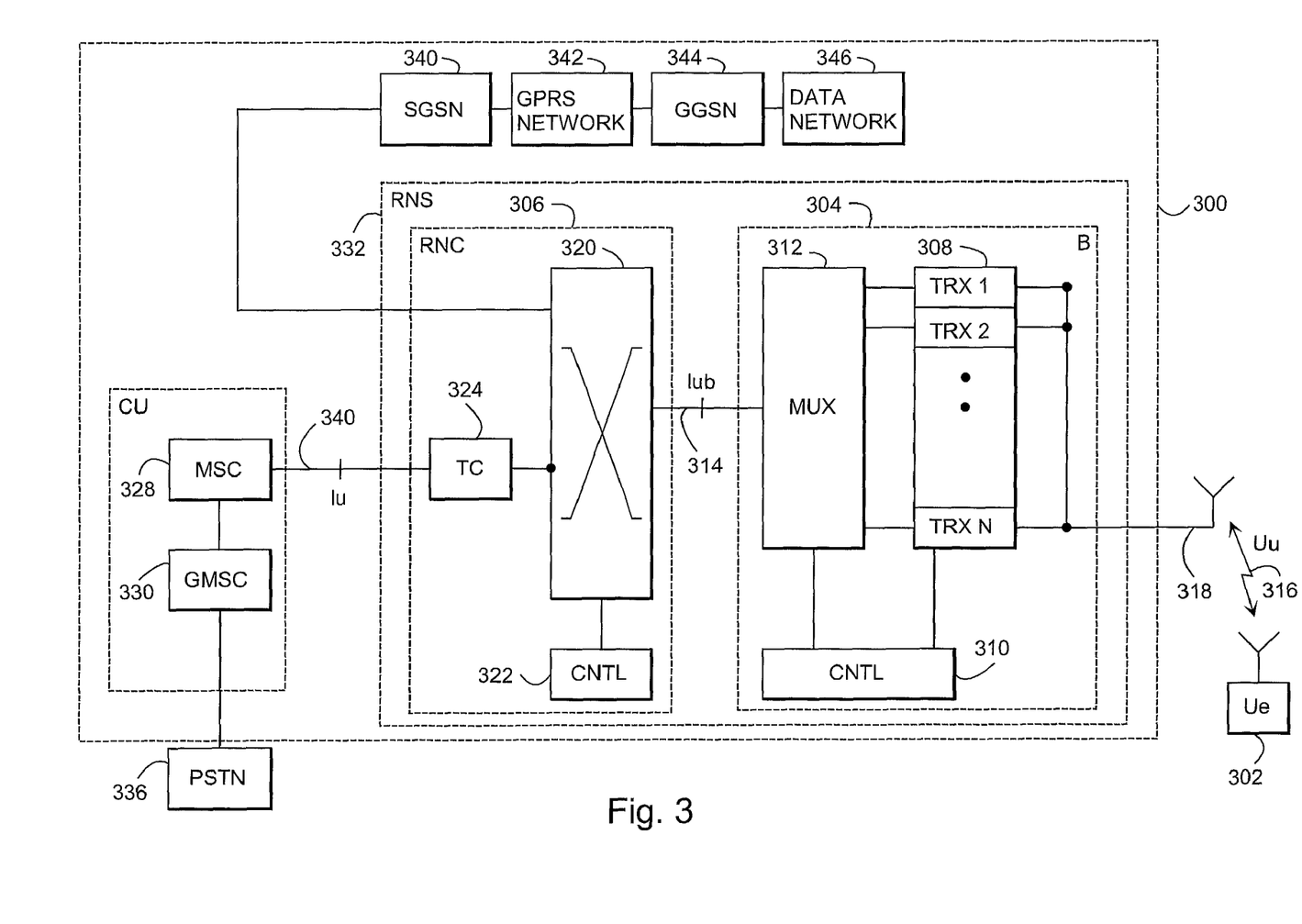
FIG. 3 illustrates in more detail the structure of the mobile telephone system used as an example.

The description in FIG. 2 is rather abstract, so it is clarified in the more detailed example of a cellular radio system in FIG. 3. FIG. 3 only contains the most essential blocks, but it is obvious to a person skilled in the art that a conventional cellular radio network also comprises other functions and structures whose more detailed description is not necessary herein. It should also be noted that FIG. 3 only shows one exemplary structure. In systems of the invention, the details may differ from what is shown in FIG. 3, but these differences have no relevance to the invention.

A cellular radio network typically comprises a fixed network infrastructure, i.e. network part 300, and subscriber terminals 302 which may be fixedly installed terminals, terminals installed in a vehicle or portable terminals. The network part 300 has base stations 304. A base station corresponds to a B node of the previous figure. A radio network controller 306 controls in a centralised manner several base stations 304 connected to it. The base station 304 has transceivers 308 and a multiplexing unit 312.

The base station 304 further has a control unit 310 which controls the operation of the transceivers 308 and the multiplexer 312. The multiplexer 312 places the traffic and control channels used by several transceivers 308 on one transmission connection 314. The transmission connection 314 forms an interface Iub.

The transceivers 308 of the base station 304 are connected to an antenna unit 318 by means of which a bi-directional radio connection 316 to the subscriber terminal 302 is implemented. The structure of the frames transmitted in the bi-directional radio connection 316 is defined specifically for each system and is called an air interface Um.

The radio network controller 306 comprises a group switching field 320 and a control unit 322. The group switching field 320 is used to switch speech and data and to connect signalling circuits. A radio network subsystem 332 formed by the base station 304 and the radio network controller 306 also comprises a transcoder 324. The transcoder 324 is usually located as close to a mobile switching centre 328 as possible, because speech can then be transmitted in cellular radio network format between the transcoder 324 and the radio network controller 306, saving transmission capacity.

The transcoder 324 transforms the different digital speech coding formats used between the public telephone network and the radio telephone network to be compatible with each other, for instance from the fixed network format to a cellular radio network format and vice versa. The control unit 322 takes care of call control, mobility management, collection of statistics and signalling.

FIG. 3 further shows a mobile switching centre 328 and a gateway mobile switching centre 330 which manages the external connections of the mobile telephone system, in this example to the public telephone network 336.

As can be seen in FIG. 3, with the group switching field 320 it is possible to switch both to the public switched telephone network (PSTN) 336 through the mobile switching centre 328 and to a packet-switched network 342.

The connection between the packet-switched network 342 and the group switching field 320 is set up by a serving GPRS support node (SGSN) 340. The task of the support node 340 is to transfer packets between the base station system and a gateway GPRS support node (GGSN) 344, and to register the location of the subscriber terminal 302 in its area.

The gateway node 344 connects the public packet-switched network 346 and the packet-switched network 342. An Internet protocol or an X.25 protocol can be used in the interface. The gateway node 344 hides by capsulating the internal structure of the packet-switched network 342 from the public packet-switched network 346, so to the public packet-switched network 346, the packet-switched network 342 appears as a subnetwork, and the public packet-switched network can address packets to the subscriber terminal 302 in this subnetwork and receive packets from it.

The packet-switched network 342 is typically a private network using an Internet protocol, which transmits signalling and tunnelled user data. The structure of the network 342 may vary by operator both in architecture and in protocols below the Internet protocol layer.

The public packet-switched network 346 can be the world-wide Internet, for instance.

Time-slots free from circuit-switched transmission are typically used in packet switching in the air interface 316. The capacity for packet transmission is allocated dynamically, i.e. when a data transmission request arrives, any free channel can be allocated for the packet transmission. The arrangement is flexible, and the circuit-switched connections have priority over the packet-switched connections. If necessary, a circuit-switched transmission overrides a packet-switched transmission, i.e. a time-slot used by a packet transmission is allocated to a circuit-switched transmission. This can be done, since packet transmission endures well this kind of interruption: the transmission is just continued in another time-slot allocated for its use. The arrangement can also be implemented in such a manner that the circuit-switched transmission is not given an absolute priority and the circuit-switched and packet-switched transmission requests are served in the order of arrival. These arrangement do no, however, have any relevance to the present invention.

Figure 4:
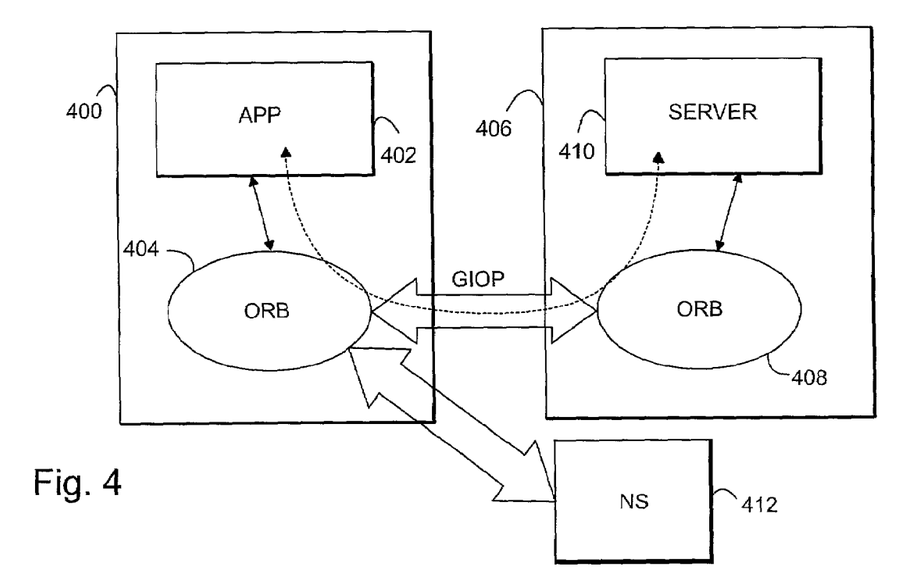
FIG. 4 illustrates the CORBA architecture on a general level.

Let us next examine data transmission according to the CORBA architecture on a general level by means of FIG. 4. FIG. 4 shows a wireless apparatus 400 running a software application 402. The application requires a service, for instance data from a database, and sends a method call in which this service is defined. The apparatus comprises a second service broker application which is called ORB (Object Request Broker) 404 and which processes the method calls of various applications. The ORB finds the address of a service provider (a suitable server) by sending an enquiry to a CORBA name server 412. After receiving a reply, the ORB forwards the method call to the server in question. In the case in FIG. 4, a suitable server was not found under the same ORB, so the method call is forwarded using the GIOP protocol to a service broker application 408 of another apparatus 406, which then forwards the call to a suitable server 410 connected to it, which is typically another software application. This server provides a reply which is then transmitted back to the original software application 402. The software application 402 does not know the location of the server, but only sees its environment through the method calls. The service brokers and software can be implemented by different programming languages and in different hardware solutions. Authentication of parties according to the CORBA architecture are performed during data transmission.

Figure 5:
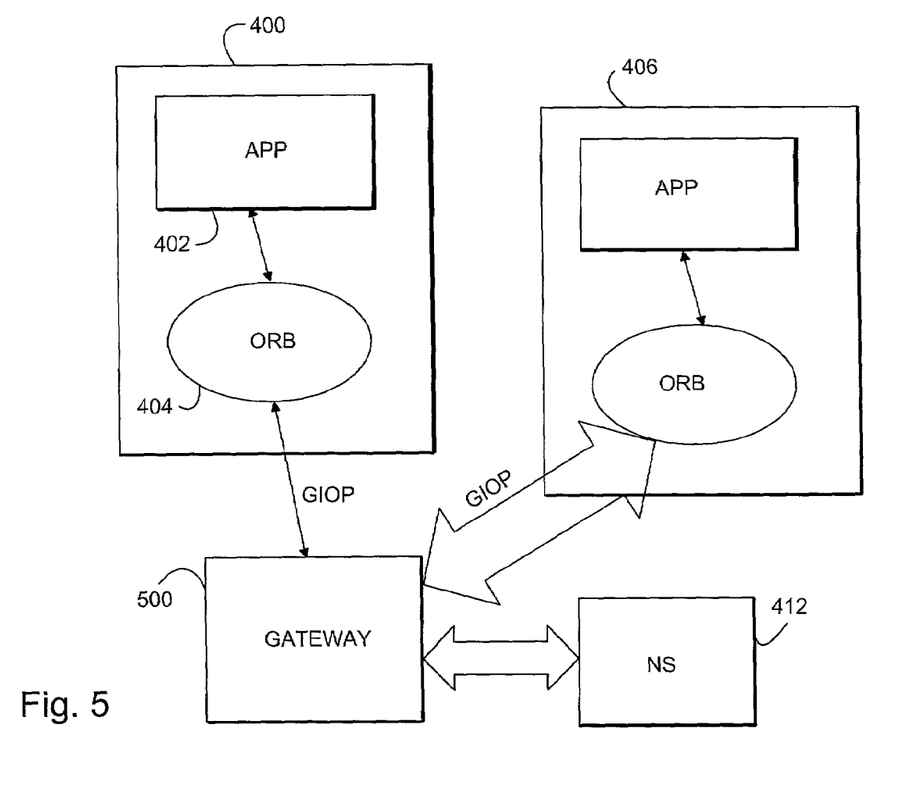
FIG. 5 illustrates the CORBA architecture as applied in a preferred embodiment.

FIG. 5 illustrates data transmission according to the CORBA architecture in a preferred embodiment of the invention, in which at least one of the apparatuses taking part in the data transmission is behind a wireless connection. FIG. 5 shows a wireless apparatus 400 running a software application 402. The application requires a service, for instance data from a database, and sends a method call in which this service is defined. As above, the apparatus comprises a second service broker application which is called ORB (Object Request Broker) 404 and which processes the method calls of various applications. In the solution of the embodiment, the service broker transmits the message on to an adapter 500 using a separate WIOP protocol (Wireless Inter-ORB Protocol) adapted for a wireless connection. The adapter adapts the protocol used on the wireless connection to the rest of the network and finds the address of the server providing the requested service from the name server 412 on behalf of the apparatus which sent the method call and operates in a wireless network. The adapter finds a suitable server, in this example an application 410 in the apparatus 406, and sends a message through the corresponding ORB 408 using the GIOP protocol. The connection between the adapter and the apparatus 406 can be an Internet connection, for instance, wherein the GIOP is implemented by means of the IIOP protocol.

The connection from the wireless apparatus 400 to the adapter 500 can be implemented in several different ways, such as by short messages or a data call (in the GSM environment), by packet traffic (GPRS) or by other wireless methods, such as Bluetooth or infra-red connections.

Figure 6:
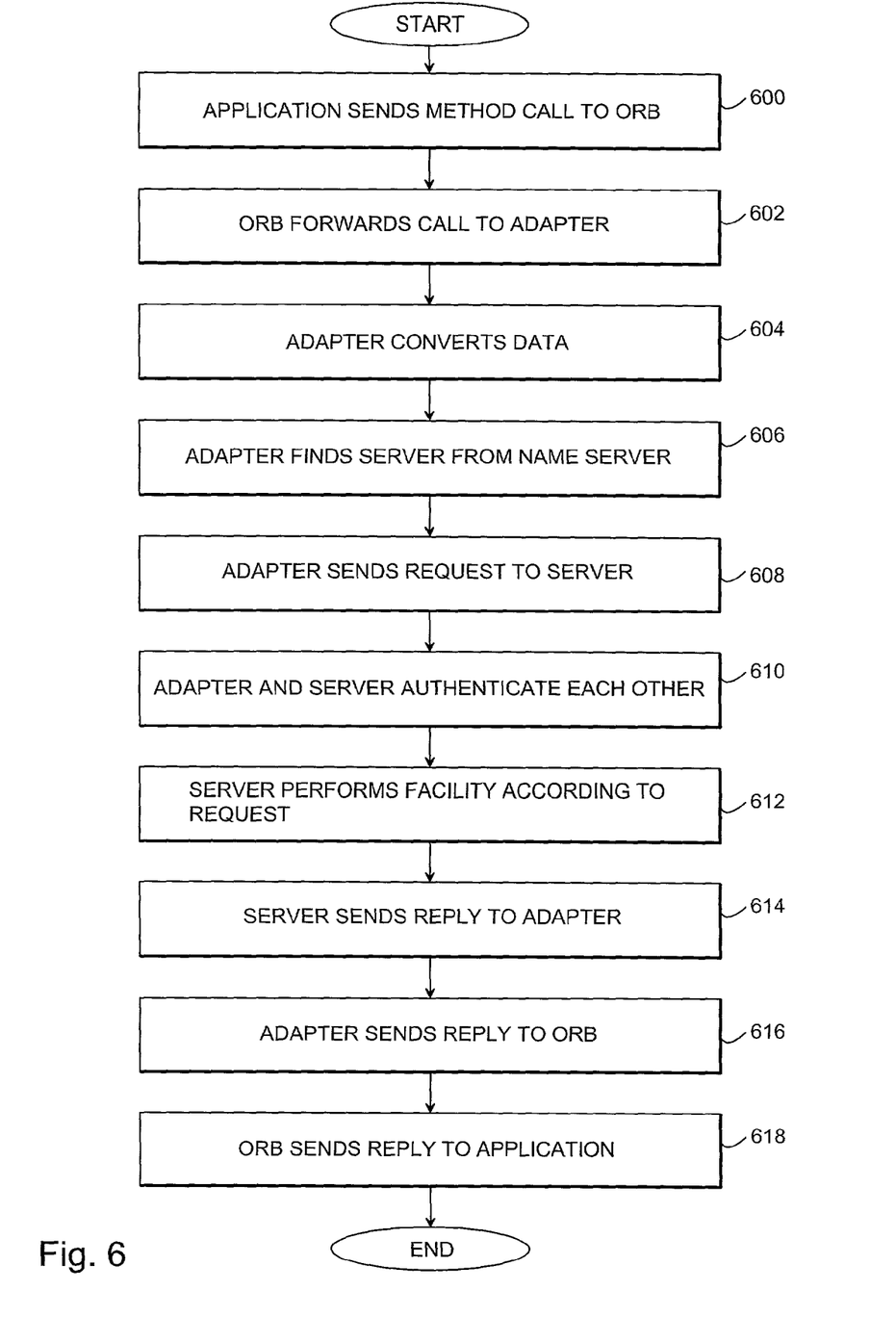
FIG. 6 is a flow chart of a preferred embodiment.

The flow chart 6 illustrates an example of the method of a preferred embodiment. First a software application of a wireless apparatus sends a method call to a service broker according to the CORBA architecture in step 600. The method call contains a service request. The service broker receives the request and forwards it to an adapter in step 602. By this time, the service in the request has been identified in text or binary format, for instance, in a condensed form so that the required transmission capacity is small. The adapter receives the message and converts in step 604 the service data into data according to the CORBA architecture, which can be used in a fixed network. The adapter comprises a table, for instance, from which the adapter can check the item name according to the CORBA architecture corresponding to the service definition in text or binary format and used by the wireless service broker. In step 606, the adapter finds the address of a server from the name server. After receiving the address data, the adapter sends the service request to the server in step 608, possibly through a second service broker. The GIOP protocol according to the CORBA architecture is used in this step. In step 610, the server and the service requester authenticate each other according to the CORBA architecture. The adapter represents here the actual service requester to avoid extra traffic on the wireless transmission path. In step 612, the server performs the facility according to the request and in step 614, sends a reply to the adapter, if necessary through its own service broker. In step 616, the adapter converts the data to a wireless protocol and transmits the reply to the service broker of the application requesting the service, which transmits the reply to the application in step 618.

Figure 7:
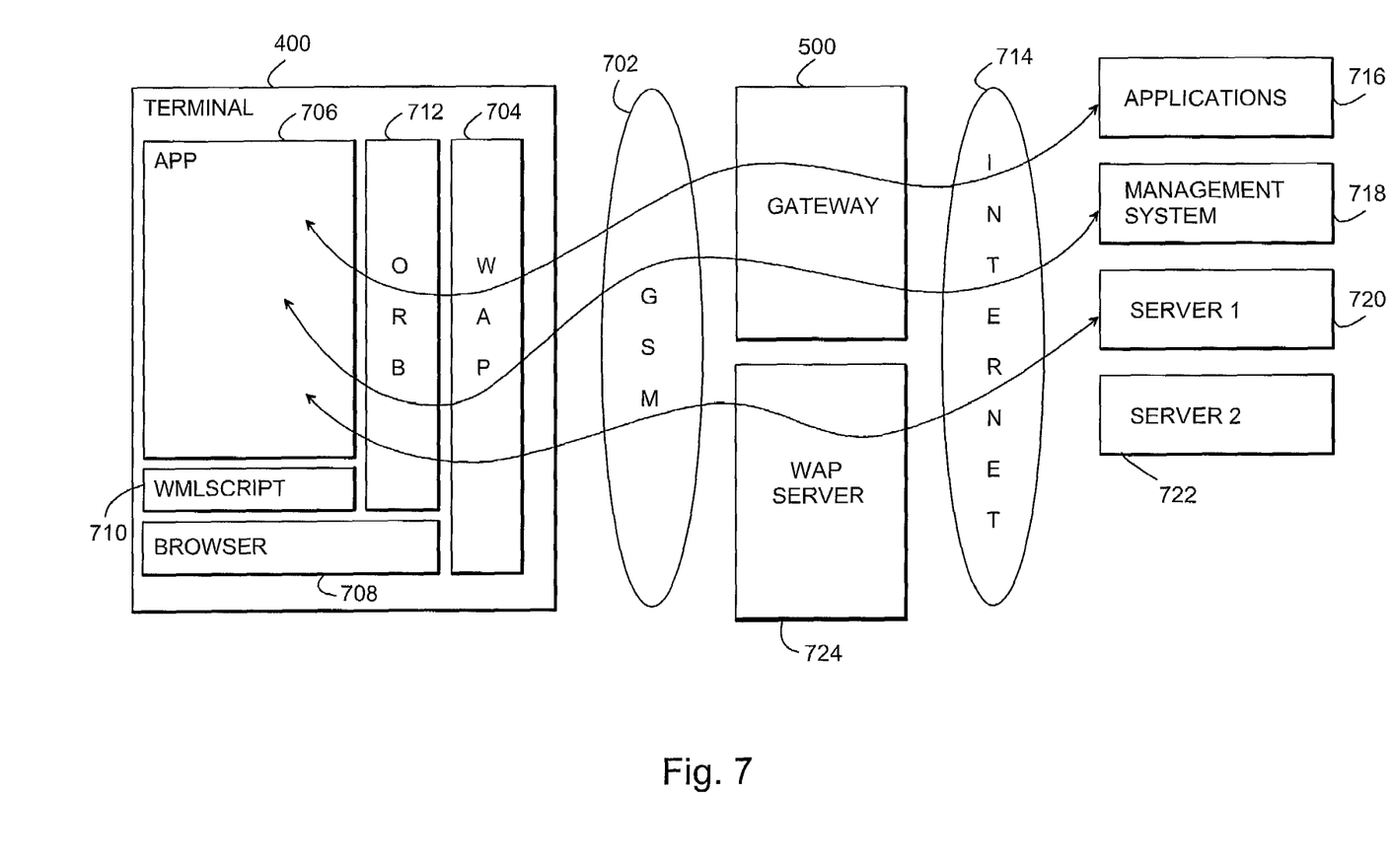
FIGS. 7 and 8 illustrate preferred embodiments of the arrangement of the invention.

Let us next examine the example of an arrangement of a preferred embodiment of the invention in FIG. 7. The figure shows a wireless apparatus 400 which in the example of the figure operates in a GSM system 702. The apparatus comprises a WAP (Wireless Application Protocol) interface 704. The WAP is a protocol definition by means of which subscriber terminals of a mobile telephone system can use services implemented in the Internet or a corporate intranet.

The apparatus further comprises one or more software applications 706 whose user interface can be implemented by means of an Internet browser 708 and a WML script programming language 710, for example, or by other means which are not essential to this case. The apparatus also typically comprises a service broker ORB 712 implemented by program.

When the software application 706 of the apparatus requires a service, it sends, as described above, a service request to the service broker 712. The service broker sends the message on preferably using the WAP protocol, for instance, to an adapter 500. The wireless transaction protocol WTP of the WAP, for instance, can be used in transmitting the message. The adapter 500 converts the request and sends it on, as described above, through the Internet 714, for instance, to a suitable application 716 to 722.

The arrangement may also comprise a WAP server 724 which manages the other Internet functions, such as the browser functions, of the apparatus 400.

Figure 8:
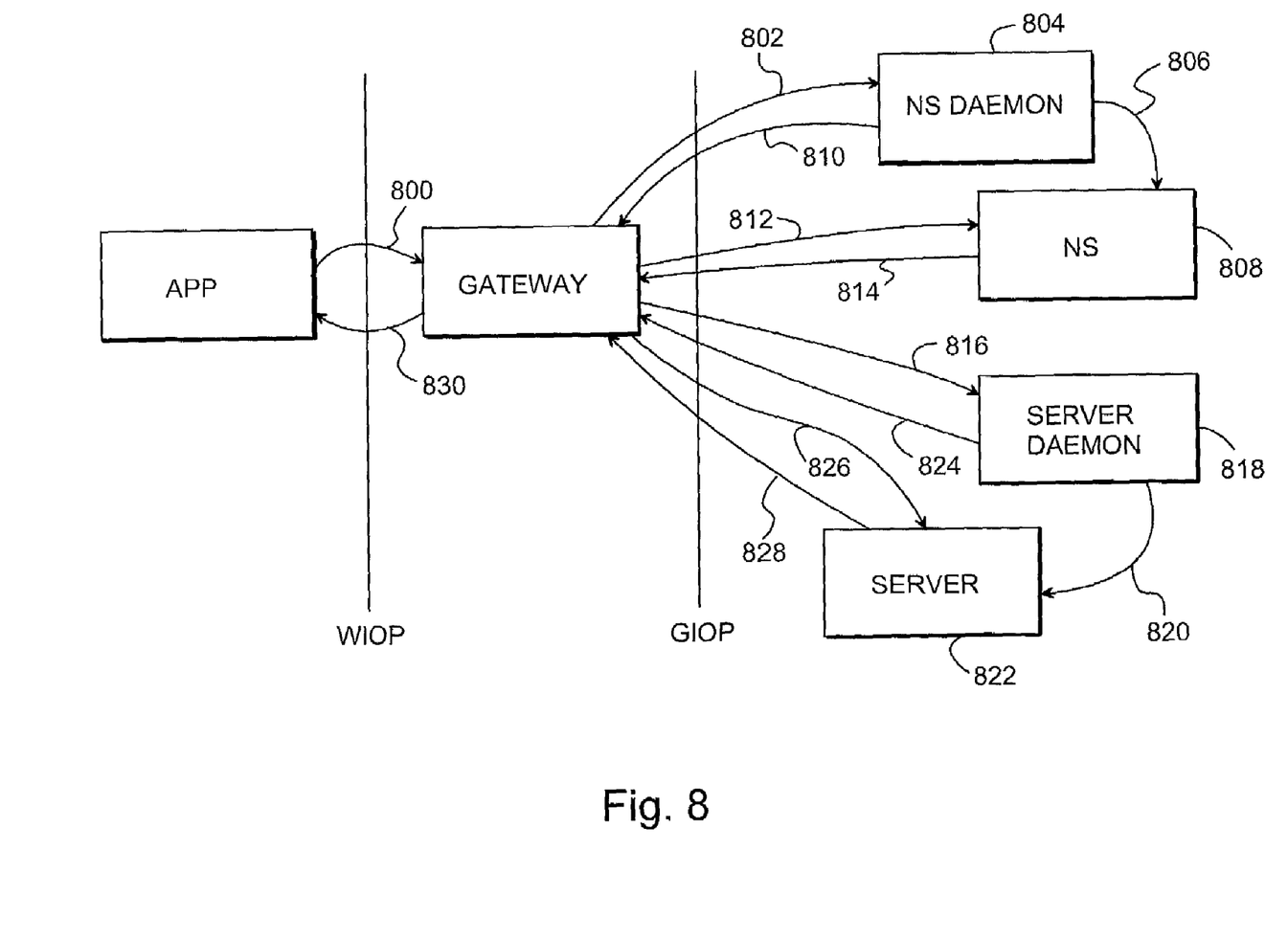

Let us now examine the example of the operation of the adapter 500 in FIG. 8. An application in the apparatus 400 sends a request 800 through a service broker to the adapter 500. The adapter sends an address request to a given name server 804. Let us assume in this example that the name server program is not enabled and what is known as a daemon 804 will reply, initiate 806 the actual name server 808 and forward 810 to the adapter the address of the initiated name server 808. The adapter sends the address request 812 to the name server 808. The name server replies with an address message 814. The adapter sends the service request 816 to the provided address. Let us assume that the required server program is not enabled, and a second daemon 818 replies, initiates 820 the actual server 822 and forwards 824 to the adapter the address of the initiated server 822. The adapter sends the service request 826 to the provided address to the server 822. The server executes the required service and replies 828 to the adapter. The adapter converts the reply message into one suitable for a wireless network and sends 830 it to the application of the apparatus 400. Some advantages provided by the solution of the preferred embodiment can be seen from this example. In a prior art solution, eight messages (802, 810, 812, 814, 816, 824, 826, 828) according to the GIOP protocol are transmitted. By means of the solution described above, only two messages (800, 830) are transmitted on the wireless transmission path. This both speeds up the data transmission and lessens the load of the often restricted capacity of the wireless transmission path and the wireless apparatus.

Figure 9:
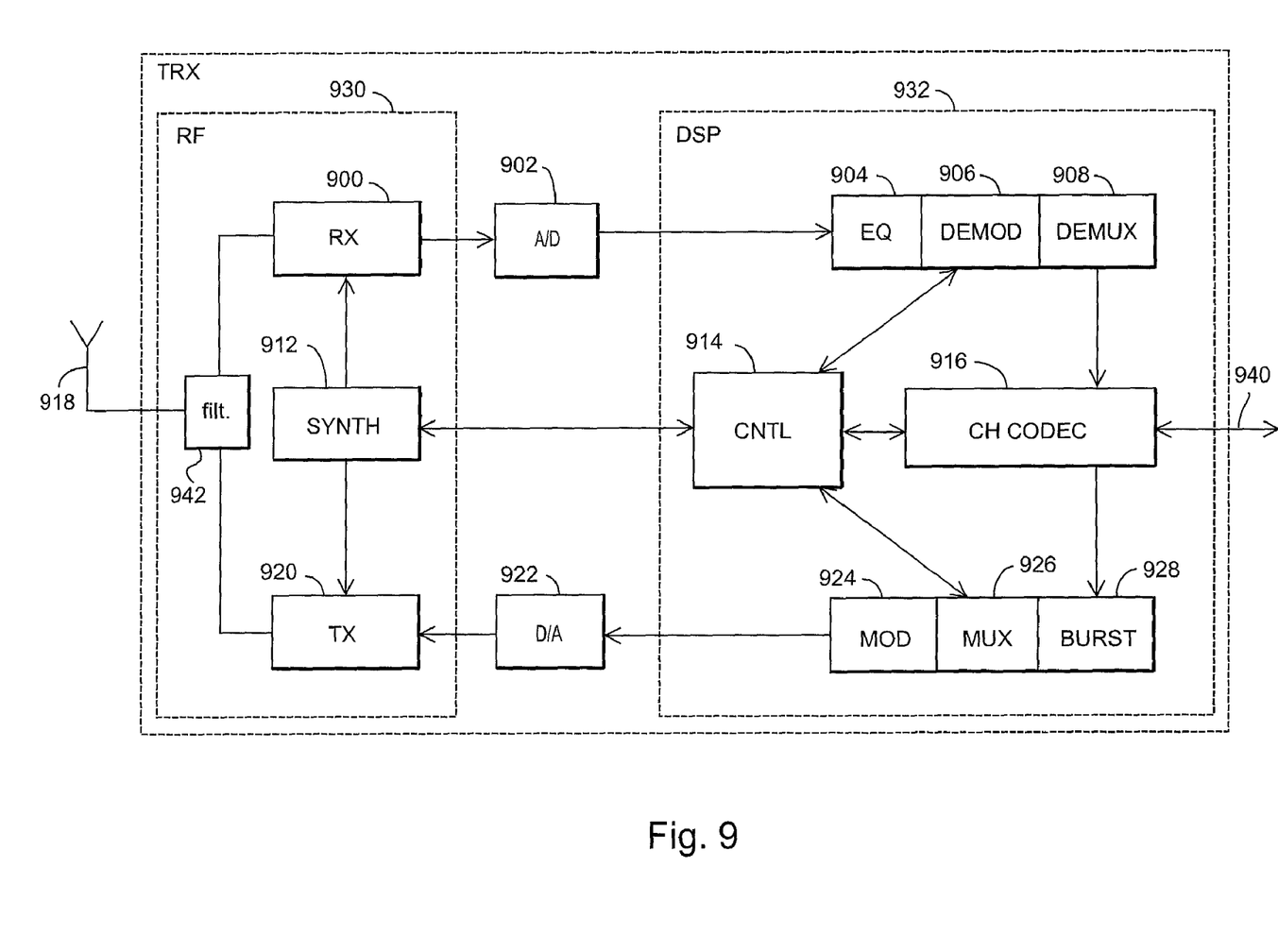
FIG. 9 illustrates the structure of an apparatus suitable for use in the arrangement of the invention.

FIG. 9 illustrates the structure of a wireless system, to which the solution according to the preferred embodiments of the invention can be applied. The apparatus comprises an antenna 918 for transmitting and receiving signals. From the antenna, a signal is taken to a duplex filter which separates the transmission and reception direction signals from each other. A receiver 900 comprises a filter which prevents any frequencies outside the desired frequency band. Next, the signal is converted to an intermediate frequency or directly to base band, and the resulting signal is sampled and quantized in an analogue-to-digital converter 902. An equaliser 904 compensates for interference, for instance interference caused by multipath propagation. A demodulator 906 extracts from the equalised signal a bit stream which is transmitted to a demultiplexer 908. The demultiplexer 908 separates the bit stream from different time-slots into their own logical channels. A channel codec 916 decodes the bit stream of different logical channels, i.e. decides whether the bit stream is signalling data to be transmitted to a control unit 914, or speech to be transmitted 940 on to a speech decoder, for instance. The channel codec 916 also does error correcting. The control unit 914 performs internal control tasks by managing various units. A burst generator 928 adds a training sequence and tail bits to the data coming out of the channel codec 916. The multiplexer 926 indicates to each burst its time-slot. A modulator 924 modulates digital signals to a radio frequency carrier. This function is analogue and requires a digital-to-analogue converter 922. A transmitter 920 comprises a filter which restricts the bandwidth. In addition, the transmitter 920 controls the output power of transmission. A synthesiser 912 arranges the required frequencies for various units. The clock of the synthesiser 912 may be locally controlled. The synthesiser 912 creates the required frequencies by a voltage-controlled oscillator, for instance.

The structure of a transceiver can in the manner shown in FIG. 9 be yet divided into radio frequency parts 930 and a digital signal processor with its software 932. The radio frequency parts 930 comprise a receiver 900, a transmitter 920 and synthesiser 912. The digital signal processor and its software 932 comprises an equaliser 904, demodulator 906, demultiplexer 908, channel codec 916, control unit 914, burst generator 928, multiplexer 926 and modulator 924. To convert a analogue radio signal into digital requires an analogue-to-digital converter 902 and correspondingly, to convert a digital signal into analogue requires a digital-to-analogue converter 922.

Further, the apparatus may comprise user interface parts, such as a display, keyboard, ear piece and microphone. These are, however, not shown in the figure. The control unit 914 of the apparatus is typically implemented by a microprocessor, its memory elements and the necessary software. The control unit can run software that requires various services as described above.

Figure 10:
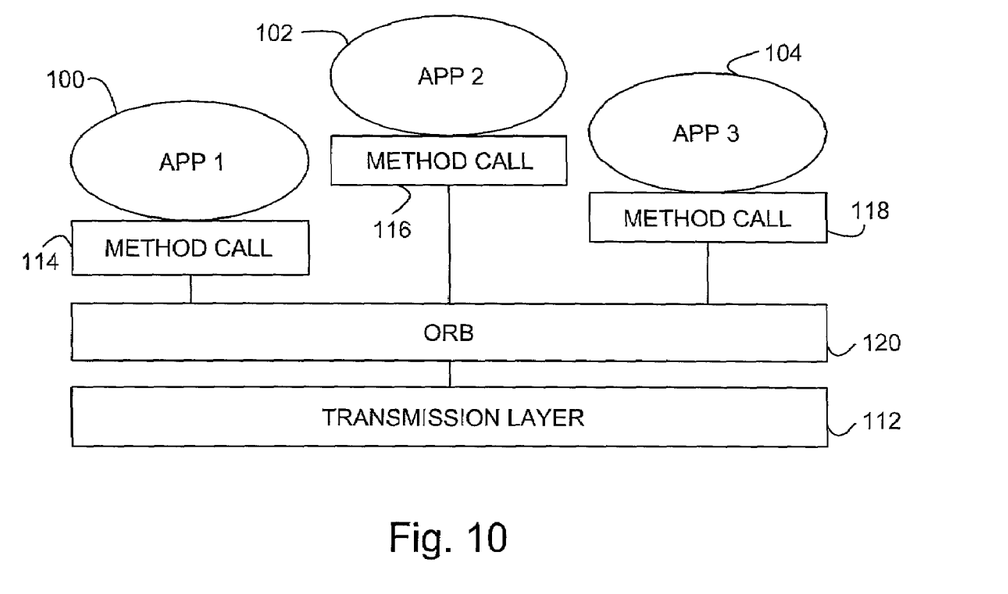
FIG. 10 illustrates an example of application protocols of software.

Finally, let us examine one more example of a solution according to a preferred embodiment of the invention. This is illustrated by FIG. 10. The figure shows three software applications 100 to 104 operating in an apparatus using a wireless connection. Each software is by means of method calls 114 to 118 connected to a common service broker ORB 120. The service broker is also connected to the transmission layer 112. Thus, the software does not have its own protocols, but data transmission takes place by means of method calls, and the software is separate from the transmission layer 112 and requires no knowledge of it.

Even though the invention has above been described with reference to the examples in the attached drawings, it is obvious that the invention is not limited to them, but it can be modified in many ways within the scope of the inventive idea disclosed in the attached claims.

The invention claimed is:

1. A method of implementing data transmission between at least two apparatuses which comprise means for establishing a connection with a data transmission system, the method comprising:

implementing at least a part of the connection between at least two different apparatuses by a wireless connection, performing at least a part of the communication of the apparatuses by means of method calls, each method call containing a service request, performing authentication of the parties during communication to improve safety, directing a method call to a service broker of the system, sending the method calls from apparatuses using wireless connections to an adapter by the service broker, adapting by the adapter the protocol used in the wireless connection to the rest of the network, finding a server providing the requested service by the adapter on behalf of the apparatus which sent the method call and which operates in a wireless network, directing the service request contained in the method call by the service broker to the provided server, sending a reply to the method call by the provided server according to the required service by sending the information required for the service to the service broker, sending the information to the sender of the method call by the service broker.

2. A method as claimed in claim 1, further comprising the step of taking care of the authentication of the parties by the adapter on behalf of the apparatus which sent the method call and operates in a wireless network.

3. A method as claimed in claim 1, further comprising the step of requesting information by sending a method call by the software comprised by the apparatuses of the system.

4. A method as claimed in claim 1, further comprising the step of sending a method call by the software of the apparatus behind the wireless connection, the method call comprising a service request in a substantially shorter format than in a service request of an apparatus behind fixed connection.

5. A method as claimed in claim 1, further comprising the step of sending a method call by the software of the apparatus behind the wireless connection, the method call comprising a service request in text format.

6. A method as claimed in claim 1, further comprising the step of adapting the service request by the adapter to suit the rest of the network.

7. A method as claimed in claim 1, further comprising the step of sending a method call by means of one or more short messages by the apparatus behind the wireless connection.

8. A method as claimed in claim 1, further comprising the step of sending a method call by means of a data call by the apparatus behind the wireless connection.

9. A method as claimed in claim 1, further comprising the step of sending a method call as a packet data service by the apparatus behind the wireless connection.

10. A method as claimed in claim 1, where in the adapter sends the reply message of the server to the apparatus behind the wireless connection by means of one or more short messages.

11. A method as claimed in claim 1, where in the adapter sends the reply message of the server to the apparatus behind the wireless connection by means of a data call.

12. A method as claimed in claim 1, where in the adapter sends the reply message of the server to the apparatus behind the wireless connection as a packet data service.

13. A method as claimed in claim 1, where in the adapter and the apparatus behind the wireless connection transmit data by means of the Bluetooth method.

14. A method as claimed in claim 1, where in the adapter and the apparatus behind the wireless connection transmit data by means of an infrared connection.

* * * * *